SPACED-PULSE TYPE IMPULSE SENDER

Filed Dec. 29, 1949 4 Sheets-Sheet 1

INVENTORS K. S. DUNLAP
C. A. LOVELL

BY William F. Simpson

ATTORNEY

SPACED-PULSE TYPE IMPULSE SENDER

Filed Dec. 29, 1949 4 Sheets-Sheet 2

INVENTORS K. S. DUNLAP
C. A. LOVELL
BY
William F. Simpson
ATTORNEY

SPACED-PULSE TYPE IMPULSE SENDER

Filed Dec. 29, 1949 4 Sheets-Sheet 3

INVENTORS K. S. DUNLAP
C. A. LOVELL
BY William F. Simpson
ATTORNEY

SPACED-PULSE TYPE IMPULSE SENDER

Filed Dec. 29, 1949 4 Sheets-Sheet 4

PULSE POSITIONS AS A FUNCTION OF TIME

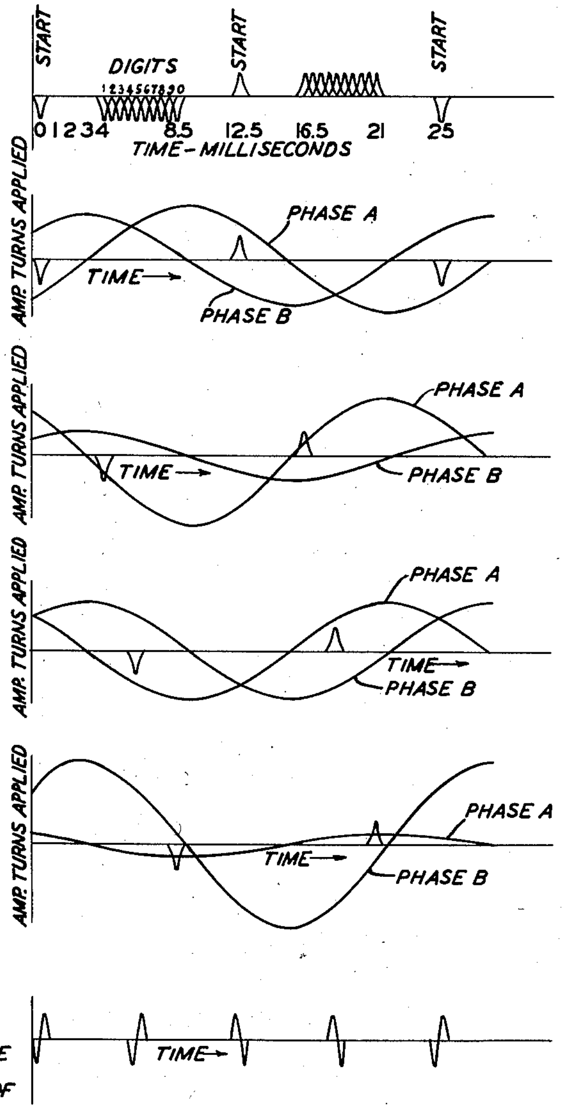

FIG. 11, FIG. 11A, FIG. 11B, FIG. 11C, FIG. 11D, FIG. 11E

FIG. 11A GENERATION OF START PULSES

FIG. 11B GENERATION OF PULSES REPRESENTING DIGIT 1

FIG. 11C GENERATION OF PULSES REPRESENTING DIGIT 5

FIG. 11D GENERATION OF PULSES REPRESENTING DIGIT 10

FIG. 11E THE START PULSES AND PULSES REPRESENTING THE DIGIT 5 AS APPLIED TO THE LINE DURING ONE CYCLE OF THE EXCITATION PERIOD

INVENTORS K. S. DUNLAP
C. A. LOVELL
BY William F. Simpson.
ATTORNEY

Patented Apr. 29, 1952 2,594,300

UNITED STATES PATENT OFFICE 2,594,300

SPACED-PULSE TYPE IMPULSE SENDER

Kermit S. Dunlap and Clarence A. Lovell, Summit, N. J., assignors to Bell Telephone Laboratories, Incorporated, New York, N. Y., a corporation of New York Application December 29, 1949, Serial No. 135,795

3 Claims. (Cl. 179—90)

This invention relates to improvements in telephone call signal apparatus, circuits, and methods, and more specifically to improvements in telephone call signaling apparatus, circuits, and methods disclosed in applications of Parkinson, Serial No. 39,015, filed July 16, 1948, now Patent 2,499,606, granted March 7, 1950 and Serial No. 131,875, filed December 8, 1949, now Patent No. 2,590,875, granted April 1, 1952, in which calling apparatus and circuits are of the present type and generate pulses of electric current which may be transmitted over voice frequency telephone channels.

An object of the present invention is to simplify and reduce the amount of equipment necessary at a subscriber's station for generating electrical signaling current pulses of the type required in systems such as set forth in the above-identified Parkinson patent applications.

Another object of this invention is to reduce interfering currents and require less power for generating the signaling pulses by generating only those pulses which are necessary to transmit the necessary signals over the subscriber's line.

Another object is to provide calling apparatus for generating pulses which are all of substantially the same shape or wave form.

In the above-identified applications call signal generating apparatus is disclosed for generating pulses in which the magnitude or identity of each digit of the called subscriber's station identification or number is represented by the time elapsing between a start or reference pulse and a stop or digit pulse.

A feature of this invention relates to pulse generating equipment employing a saturable core pulse generating coil for the start pulse and another saturable core coil for generating the stop pulse. The stop pulse core is provided with a plurality of windings for controlling the shape and time of the generation of the stop pulse.

In transmitting pulses of short duration over voice frequency transmission paths difficulty is frequently encountered due to transients set up by the pulses. The transients are usually decaying alternating currents which are caused by resonant circuits incorporated in transmission paths, repeat coils, filters, and other transmission equipment. Transients resulting from the application of short pulses to such equipment frequently last a number of cycles and thus for an appreciable interval of time after an exciting pulse has terminated.

In accordance with the invention set forth in the above-identified patent application of Parkinson, Serial No. 39,015, now Patent No. 2,499,606, granted March 7, 1950, the signaling pulses are spaced in time so that ample time is allowed for the transients, associated with or appearing incident to the application of each of the signaling pulses to the transmission system, to die out sufficiently so that they will not interfere with the next signaling pulse, thus preventing interference with the next signaling pulse, thus preventing interaction between the various pulses representing the digits of the called number.

In the above-identified application, Serial No. 39,015, eleven impulse coils, each comprising a core of saturable material and a plurality of windings, are provided for generating the various pulses. Thus the start pulse and ten stop pulses were generated for each digit and selecting means provided for selecting the desired one of the stop pulses.

In accordance with the present invention only two impulse coils, each having a core of saturable material and a plurality of windings are provided, one for generating the start pulse and one for generating the stop pulse. The time of generation of the stop pulse is controlled by a selective switch and distributor which varies the number of turns employed in windings of the stop pulse coil. Such an arrangement requires less power, which is usually supplied over the subscriber's line, and, in addition, prevents cross-talk or interference from the stop pulse coils not selected when all of the stop pulses are generated for each digit as disclosed in the arrangement described in the above-identified application of Parkinson, Serial No. 39,015.

In Parkinson application, Serial No. 131,875 the turns of only one of the input windings is varied with the result that the shape of the generated pulse varies depending upon the time at which this pulse is transmitted. In accordance with the present invention the number of turns in the input windings connected to two different phases may be independently varied so the pulse shape may be made substantially independent of its time of generation.

These and other objects and features of the invention will be apparent from the following description, the appended claims, and the drawings, in which:

Figures 1, 2:
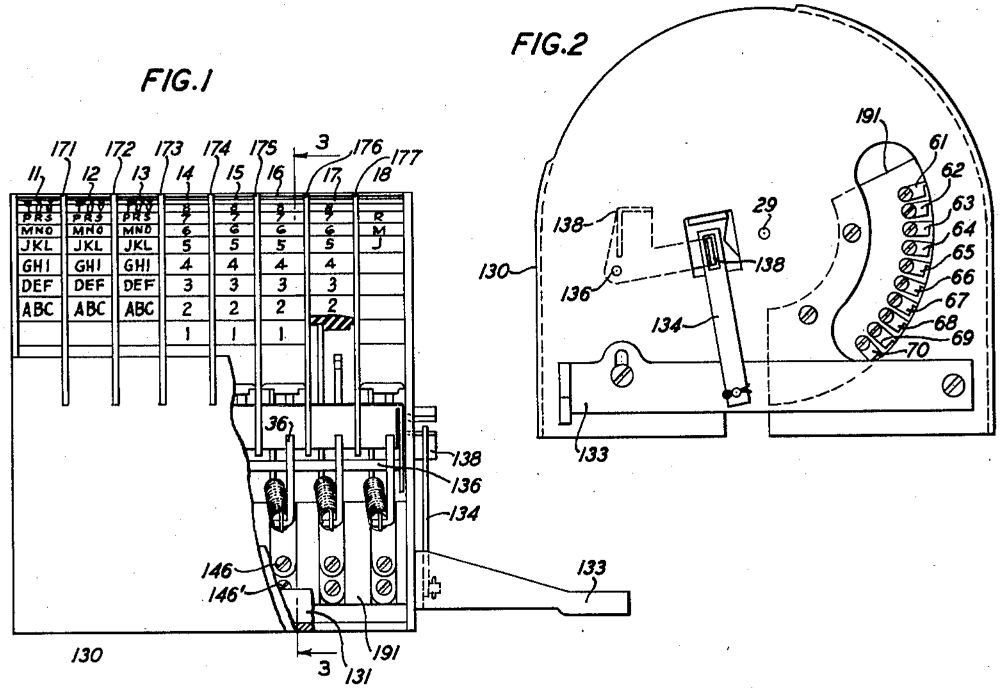
Fig. 1 is a front view, partially broken away, of the dialing apparatus.
Fig. 2 is a side view of the same apparatus.

Fig. 11 indicates the possible or assignable pulse positions as a function of time;

Fig. 11A indicates the start pulses generated in the secondary winding and the ampere-turns in the primary winding of the transformer for generating the start pulses during one cycle of the excitation current;

Fig. 11B indicates the stop pulses generated in the secondary winding and the ampere-turns in each of the primary windings of the transformer for generating the pulses representing the digit 1 during one cycle of the excitation current;

Fig. 11C indicates the stop pulses generated in the secondary winding and the ampere-turns in each of the primary windings of the transformer for generating the pulses representing the digit 5 during one cycle of the excitation current;

Fig. 11D indicates the stop pulses generated in the secondary winding and the ampere-turns in each of the primary windings of the transformer for generating the pulses representing the digit 0 during one cycle of the excitation current; and Fig. 11E indicates the start pulses and the stop pulses representing the digit 5, as generated during one cycle of the excitation current.

The manner in which the apparatus disclosed in this application may be incorporated in a complete telephone system is disclosed in copending application Serial No. 35,925 of W. A. Malthaner filed June 29, 1948. Suitable types of equipment for responding to the signaling pulses transmitted from the apparatus disclosed herein is disclosed in the copending applications of H. E. Vaughan, Serial 35,911 filed June 29, 1948; and W. A. Malthaner, N. D. Newby, and H. E. Vaughan, Serial No. 35,924 filed June 29, 1948.

A similar signaling device is disclosed in copending applications Serial No. 35,930 of D. B. Parkinson filed June 29, 1948; Serial No. 35,927 of C. A. Lovell and D. B. Parkinson filed June 29, 1948, now Patent No. 2,588,397, granted March 11, 1952; Serial No. 35,926 of C. A. Lovell and D. B. Parkinson filed June 29, 1948, now Patent No. 2,587,635, granted March 4, 1952; and Serial No. 135,794, filed December 29, 1949, of Dunlap-Lovell, now Patent No. 2,556,172.

Novel features disclosed but not claimed herein are claimed in different ones of the above-identified applications.

In the exemplary embodiment shown herein, provision is made for the generation of pulse representations of eight characters during each cycle of operation, and these pulses are repeatedly generated as long as the excitation current is applied. Any arbitrarily chosen number of representations of characters (within reasonable limits) may be generated by properly designed signaling apparatus. A maximum of eight representations of characters was selected for this disclosure since eight-character calling numbers are in common use in telephone systems. It will be understood that these characters may be digits or letters or a combination of the two as commonly used in designating telephone calls. Each of the digits 0 to 9 will be represented by a different combination of two pulses, the pulse combination representing the digit 2 will also represent the letters A, B and C; the pulse combination representing the digit 3 will also represent the letters D, E and F; and so on. Hereinafter each combination of eight characters will be referred to as each called number irrespective of whether the combination comprises digits or letters and digits.

In accordance with an exemplary embodiment of this invention, each of the pulses generated is of about 1 millisecond in duration. When pulses of this duration are transmitted over various types of voice frequency communication paths encountered in telephone systems, about 3½ milliseconds are required for the longest transients to die out sufficiently so that the succeeding pulse may be accurately recognized without interference from the transient caused by the previous pulse. In other words each transmitted pulse of approximately 1 millisecond duration is in effect lengthened by a decaying alternating current of approximately 3½ milliseconds duration. At the end of this 3½ milliseconds period or any time thereafter a second pulse may be transmitted.

The signaling system employed in this embodiment of the invention comprises a start pulse of 1 millisecond duration for each character, the start pulses being generated at 12½ milliseconds intervals as long as the pulsing transformers are energized, and a stop pulse of 1 millisecond duration for each character, each stop pulse reaching its peak value during the 4 to 8½ milliseconds interval of time after the start pulse has reached its peak value. In order to provide sufficient margins of safety to permit reliable signaling, 4 milliseconds are allowed for the decay of each pulse and the times of the start of transmission assigned to stop pulses representing digits of successive magnitudes differ by ½ millisecond. Thus, digit 1 is represented by a start pulse followed by a stop pulse which reaches its peak value 4 milliseconds after the start pulse reaches its peak value, digit 2 is represented by a start pulse followed by a stop pulse which reaches its peak value 4½ milliseconds after the start pulse reaches its peak value, and so on. It will be observed that the stop pulse for the digit 0 reaches its peak value 8½ milliseconds after its start pulse and 4 milliseconds before the next succeeding start pulse. Thus, there is required an increment of time of 4 milliseconds for the decay of the start pulse, 9 increments of time of ½ millisecond each for the generation of a pulse at any one of the ten times necessary to represent the various digits, and a last increment of time of 4 milliseconds, all of the latter being required to permit a stop pulse to decay only if it should occur at the end of the ninth increment of time. Consequently, 12½ milliseconds of time elapse between the start pulses of succeeding digits, from which it follows that 12½ milliseconds is required in this exemplary system to transmit each character designating the called number.

In order to indicate the starting point of the transmission of a called number, a time interval of approximately 25 milliseconds during which no pulses are transmitted is provided at the beginning of each pulse representation of a called number. Thus, a time interval of 125 milliseconds is required to transmit each eight-digit called number and the accompanying no-signal period. The foregoing exemplary times are based upon a supply frequency of 40 cycles per second. This invention is not limited to these times or to this driving frequency. Driving frequencies as high as 55 or 60 cycles per second have been used without materially changing the circuits. However, where desired higher or lower frequencies may be used by making minor changes in the circuit constants in well understood manners.

In accordance with this exemplary embodiment of the invention the signaling pulses are generated by saturation type pulse generating transformers. There are two transformers, one for the digit pulse representing the digits 0 to 9 and one for the start or reference pulse. The excitation current for the apparatus of the exemplary embodiment set forth herein is sinusoidal in form and is usually transmitted from a power source usually located at the central office over the line which interconnects the signaling station with the central office. This current is an alternating current of sinusoidal wave form, and at the signaling station the current is passed through a phase shifting network 203 so that the current is converted to a two-phase source in which the two currents are substantially 90 degrees out of phase.

Of course, the exciting current may be supplied locally at the subscriber's station when so desired or required or from some other point to which the subscriber's line extends.

Each of the pulse generating transformers has a single output winding and two input windings. The input windings of the transformers are interconnected and connected with the two phases of the excitation current so that one phase of the excitation current is applied to one input winding of each transformer and so that the other phase of the excitation current is applied to the other input winding of each transformer. The secondary windings of the transformers are connected to the subscriber's line.

The magnetic core of each transformer is designed to be saturated except for very small values of ampere-turns, and an electric pulse is generated in the secondary winding of each transformer when the flux is changed from saturation at one polarity to saturation at the other polarity. The flux induced in the core of each transformer depends upon the number of turns in the two primary windings of the transformer and upon the current flowing in each winding.

As shown in the drawing, both the start pulse coil 310 and the stop or digit pulse coil 301 are provided with two primary windings, one winding being connected to one of the phases of the supply current and the other winding to another phase of the polyphase supply current. In the drawing the primary windings on the start coil 301 are shown connected in parallel with the primary or input windings of the stop pulse coil 310. It is to be understood that these windings may be connected in series instead of parallel when desired and the coils operate in substantially the same manner as described herein.

The time of occurrence of both the start pulse and stop pulses relative to the respective phases of the current applied to these windings is determined by the number of ampere-turns of current from the respective phases which interlink the respective cores as is explained hereinafter.

As shown in the drawing, the stop pulse coil is provided with a tapped winding connected to phase A from the simplex coil 204 and a tapped winding connected to phase B from network 203. The taps of the windings are connected to ground and thus to the source of alternating current and the particular taps to which ground is connected determines the number of ampere-turns applied to the core of the transformer 301 by currents of each phase and in this manner controls the time of occurrence of the induced pulse in its output circuit.

The manner in which the number of ampere-turns applied to the windings connected to phase A and to phase B of the stop pulse coil 301 controls the time of occurrence of the output pulse may be more readily understood by reference to Figs. 11, 11A, 11B, 11C, 11D, and 11E.

Fig. 11 shows the possible times of occurrence of the start pulses. Thus in the exemplary embodiment set forth herein there are ten different times during which a stop pulse may occur designating the identity of the digit or symbol of the called subscriber's station designation.

Fig. 11A shows the ampere-turns applied to the core of the start pulse coil 310 by both phases A and B. When the sum of these ampere-turns goes through zero a pulse is generated in the output winding which pulse is illustrated in Fig. 11. When the two phase currents have a phase displacement of 90 degrees as shown in the drawing the total number of ampere-turns is equal to the $\sqrt{N_A^2+N_B^2}$ where $N_A$ is the number of ampere-turns applied by phase A and $N_B$ is the number of ampere-turns applied to the core of phase B.

Fig. 11B shows the ampere-turns applied to the core of coil 301 when it is desired to generate a pulse representing the digit 1. In this case the number of ampere-turns applied by phase A is greater and the number of ampere-turns applied by phase B is less with the result that the time of occurrence of the output pulse is appreciably delayed as shown in Fig. 11B. Figs. 11C and 11D show progressively a greater number of ampere-turns applied to the core of transformer 301 by phase B and a progressively lesser number of ampere-turns applied by phase A to represent the higher digits. As progressively more and more ampere-turns are included in the winding connected to phase B, and less and less ampere-turns are applied to the core by phase A the output pulse is progressively delayed in time thus giving rise to the generation of the various stop pulses.

By providing two tapped input windings for the stop pulse coil 301, it is possible to simultaneously vary the ampere turns applied from each of the phases of the polyphase source to the core of the pulse generating coil 301. It is desirable to have the same total maximum number of ampere-turns applied to the core of this coil for each of the pulses generated thereby. When the total amplitude of the applied ampere-turns is the same the wave shape of each of the pulses is substantially the same, both in wave form and amplitude or magnitude. Where only one of the coils is varied as in Parkinson Serial No. 131,875, or where the number of turns in each coil is simultaneously varied by means of a single tap so that the sum of the number of turns of the two windings is constant, as disclosed in Dunlap et al. Serial No. 135,794, filed December 29, 1949, it is impossible to maintain the total magnetization at a constant level or amplitude for each of the various pulses to be generated. However, when the equipment is arranged as set forth herein to simultaneously and independently vary the number of turns in the two windings, these turns may be selected for each digit, such that the total magnetomotive force applied to the core is substantially constant and independent of the various digits or pulses generated by the coil. However, the phase of the resultant magnetomotive force, and thus the time at which it goes through zero will, of course, vary depending upon the magnitude of the currents of the two different phases flowing through the respective input windings of the coil. The time at which the magnetoforce flows and thus the flux passes through zero is the time at which the signaling pulse is generated in the output winding of the respective coils. In order to maintain the amplitude of the combined magnetomotive forces due to the two coils substantially the same maximum value (or root mean square value), taps should be provided on the coils in such positions that the square root of the sum of the squares of the ampere-turns in each winding remains substantially constant independently of which position or pair of taps, one on each of the coils, is selected. The foregoing relationship of course assumes that the phase differences between the two phase currents is substantially 90 degrees. If this phase difference is of any other value, then the ampere-turns applied from each of the phases are correspondingly adjusted so that the sum of the ampere-turns applied to the core by the two windings remains constant, taking into account of course both the maximum amplitude as well as the time displacement between the polyphase currents.

In order to simultaneously vary connections to windings, the selector switch 130 has been provided with two sets of contacts for each digit, as will be described hereinafter. Also the distributor arrangement comprising distributor brush 113 and the contact segments 91 through 98 and 91′ through 98′ have been likewise provided for selecting the desired pairs of taps for each of the digits or symbols of the called subscriber's station designation.

The output or secondary windings on both coils 301 and 310 are connected in series and the series combination of these coils connected through condenser 205, distributor segment 115, distributor 114, distributor segment 116, and then to the subscriber's line 125 extending to the central office. This circuit is closed through distributor segments 115 and 116 and distributor brush 114 at all times except during the pause between the transmission of complete subscribers' designations. During these pauses neither of the output circuits or output windings of the pulse coils are connected to the line extending to the central station. Consequently, they transmit no pulses during this silent interval.

The condenser 205 is connected in series with the series combination of the output windings of these coils to the line extending to the central office. This condenser and coil windings are provided to control the shape and duration of the pulses. The capacity of this condenser is selected so that the products of its capacity and the resistances in the circuit are less than the pulse time or interval, so that the shape of the pulse transmitted to the line is largely determined by the constants of this condenser and the other circuit elements. The condenser 205 represents a simple coupling network. However, any coupling network having a suitable degree of complexity which will provide the necessary shaping of the pulses may be employed.

It should be noted that a pulse is generated for each half cycle of the applied current in both the start pulse coil 310 and the stop pulse coil 301. It should also be noted as shown in Fig. 11 as well as Figs. 11A, B, C and D that a start pulse and its accompanying stop pulse are of one polarity while the next start pulse and next stop pulse are both of the same polarity but of opposite polarity to the immediately preceding start and stop pulses.

Fig. 11E shows the pulses transmitted over the line to the central station where they control switches as described hereinbefore for setting up communication paths.

Figure 3:
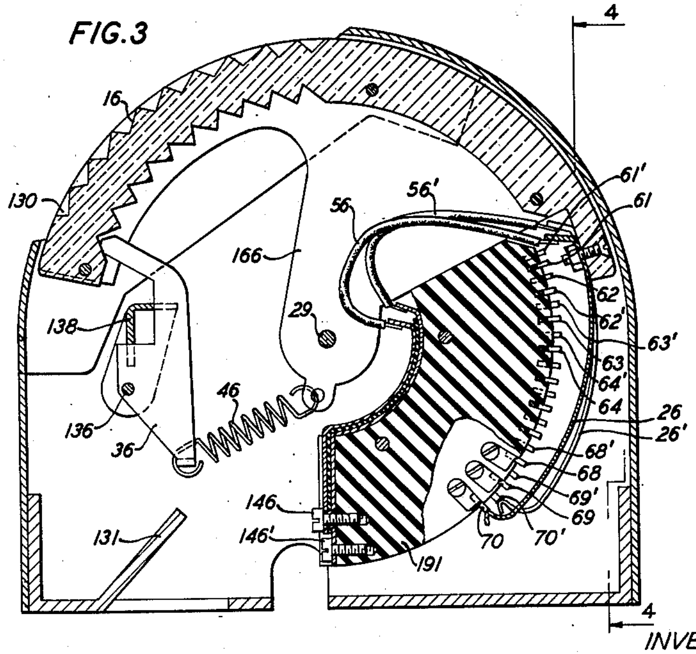
Fig. 3 shows a section taken along section line 3 of Fig. 1.

Figs. 1, 2, 3 and 4 indicate one embodiment of the selector switch. It is enclosed in case 130, with selector dials 11 to 18 and release lever 133 accessible to an operator. The selector dials are made of a non-conducting material such as hard rubber or plastic, and each dial is provided with ten indentations along its outer periphery. Each indentation is designated by a letter or number conforming to the telephone signaling system, and each is of suitable configuration to permit an operator's finger to engage and move the dial. The selector dials are separated by spacers 171 to 177 which are attached to case 130. As indicated in Fig. 3, each dial is attached to an individual support 166 so that each dial may be moved approximately one-fourth of a revolution about shaft 29. The inner surface of each dial is provided with ten grooves which correspond to the finger indentations on the outer periphery of the dial. The grooves on each dial serve to engage with a detent pawl, to secure each dial in one of the ten possible positions as selected by the operator. As indicated in Fig. 3, detent pawl 36 which corresponds to dial 16 is pivoted about shaft 136. Spring 46 is attached between support 166 and pawl 36 so that pawl 36 is normally forced against dial 16, thereby securing the dial in a fixed position by engaging with one of the ten grooves. Spring 46 also serves to apply a continuous force to support 166 which tends to rotate support 166 and dial 16 in a clockwise direction about shaft 29. The grooves on the dials and the detent pawls are shaped and positioned so that by pressing upon the finger indentations in a dial an operator can move the dial in either direction and so that the ratchet action of the pawl against the grooves secures the dial in any one of the ten positions to which is may be moved. The rotary movement of the dials is limited to about one-fourth of a revolution by stop 131 and insulator 191.

Release arm 138 is connected with release lever 133 through lever 134 and is provided with slots to engage each detent pawl. When lever 133 is in its normal position, arm 138 permits each detent pawl to engage with a groove in the corresponding dial. When lever 133 is depressed, arm 138 is moved in a clockwise direction about shaft 136 and the detent pawls are disengaged from the dials, thereby permitting the spring associated with each dial to cause each dial to return to its initial position.

Figure 4:
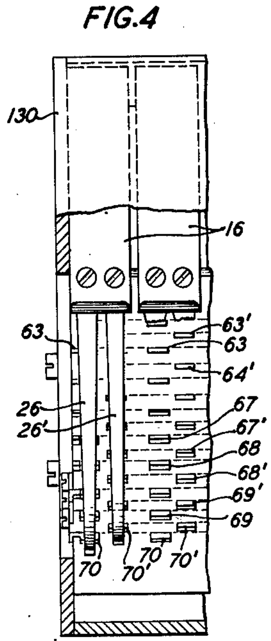
Fig. 4 is a rear view partly broken away along line 4—4 of Fig. 3 to show the contact arrangement of the manual selector arrangement.
Figure 5:
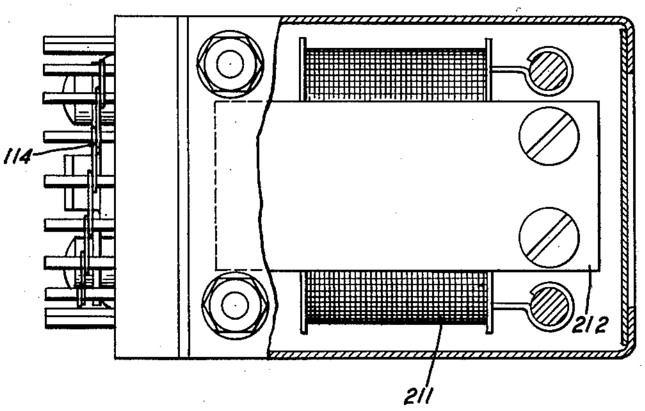
Fig. 5 is a top view, partially broken away, of the stepping mechanism.
Figure 7:
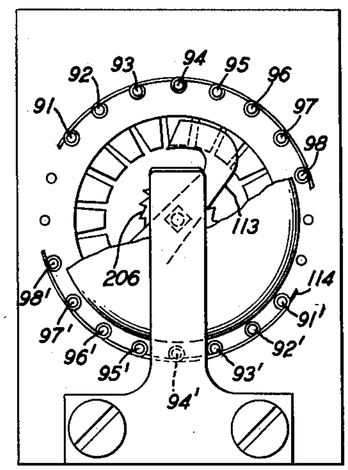
Fig. 7 is a front view, partially broken away, of the stepping mechanism.
Figure 6:
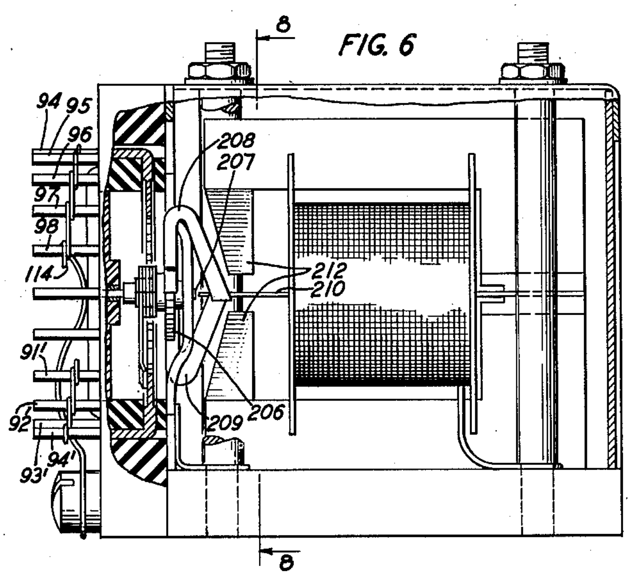
Fig. 6 is a side view, partially broken away, of the stepping mechanism.
Figure 8:
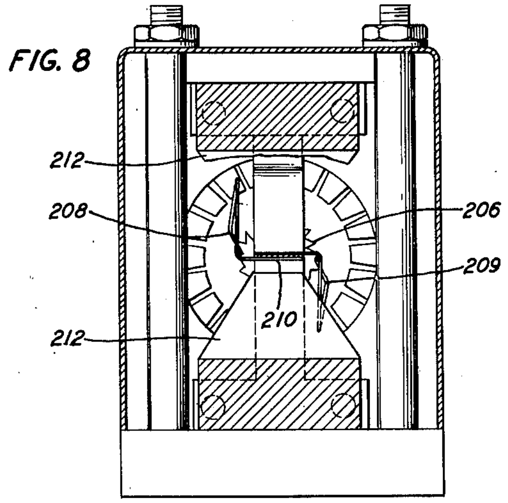
Fig. 8 shows a section, partially broken away, taken along section line 8 of Fig. 6.
Figure 9:
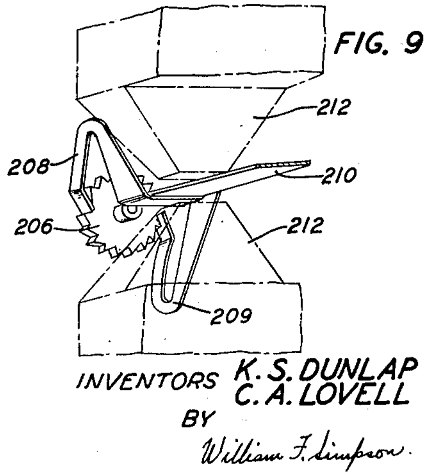
Fig. 9 is a partial disclosure of the stepping mechanism showing the pole-pieces, the armature and stepping pawls, and the ratchet wheel.

In order to provide for simultaneously changing taps on both of the windings of the stop pulse coil 301 two contact members are provided for each of the selector or dial members 11 through 18. These members are illustrated in Figs. 3 and 4 by springs 26 and 26′ and are connected by means of flexible leads of wires 56 and 56' to the corresponding terminals of screws 146 and 146'. Each of the springs 26 are arranged to make contact with one of the bus bars 61 through 70 inclusive and each spring 26' is arranged to make contact with bus bars 61' through 70'. Thus in any position of the associated finger wheel or dial such as 16 of Fig. 3, brush or contact member 26 will make contact with one of the bus bars 61 through 70 and brush or contact member 26' will make contact with the corresponding bus bar 61' through 70'. The insulating member 191 extends along the rear of the selector mechanism and supports two sets of two bus bars 61 through 70 and 61' through 70' as indicated in the drawings. In this way contacts are made between the proper taps on the respective input windings of the stop pulse coil 301 and the distributor mechanism shown in Figs. 5, 6, 7, 8 and 9 and illustrated in Fig. 10 by the contact segments 91 to 98, inclusive and 91' through 98' inclusive.

Figs. 5, 6, 7, 8 and 9 indicate one embodiment of the stepping device and distributor. The distributor comprises two brushes 113 moving over a set of contacts. Contacts 91 to 98 and the eight contacts bonded by conductor 114 serve as distributor elements. The brushes are driven by ratchet wheel 206 through shaft 207. The ratchet wheel is driven by stepping pawls 208 and 209 which are attached to magnetic reed 210. The magnetic structure is polarized by permanent magnet 212 and magnetic reed 210 is actuated by coil 211. When an alternating current is applied to coil 211, the magnetic polarity of reed 210 is changed each half cycle of the alternating current so that the reed moves both upward and downward during each cycle of the alternating current. Each time reed 210 moves upward or downward ratchet wheel 206 is moved one step by one of the stepping pawls. Thus, ratchet wheel 206 and rotor 113 are moved one step during each half cycle of the alternating current.

Figure 10:
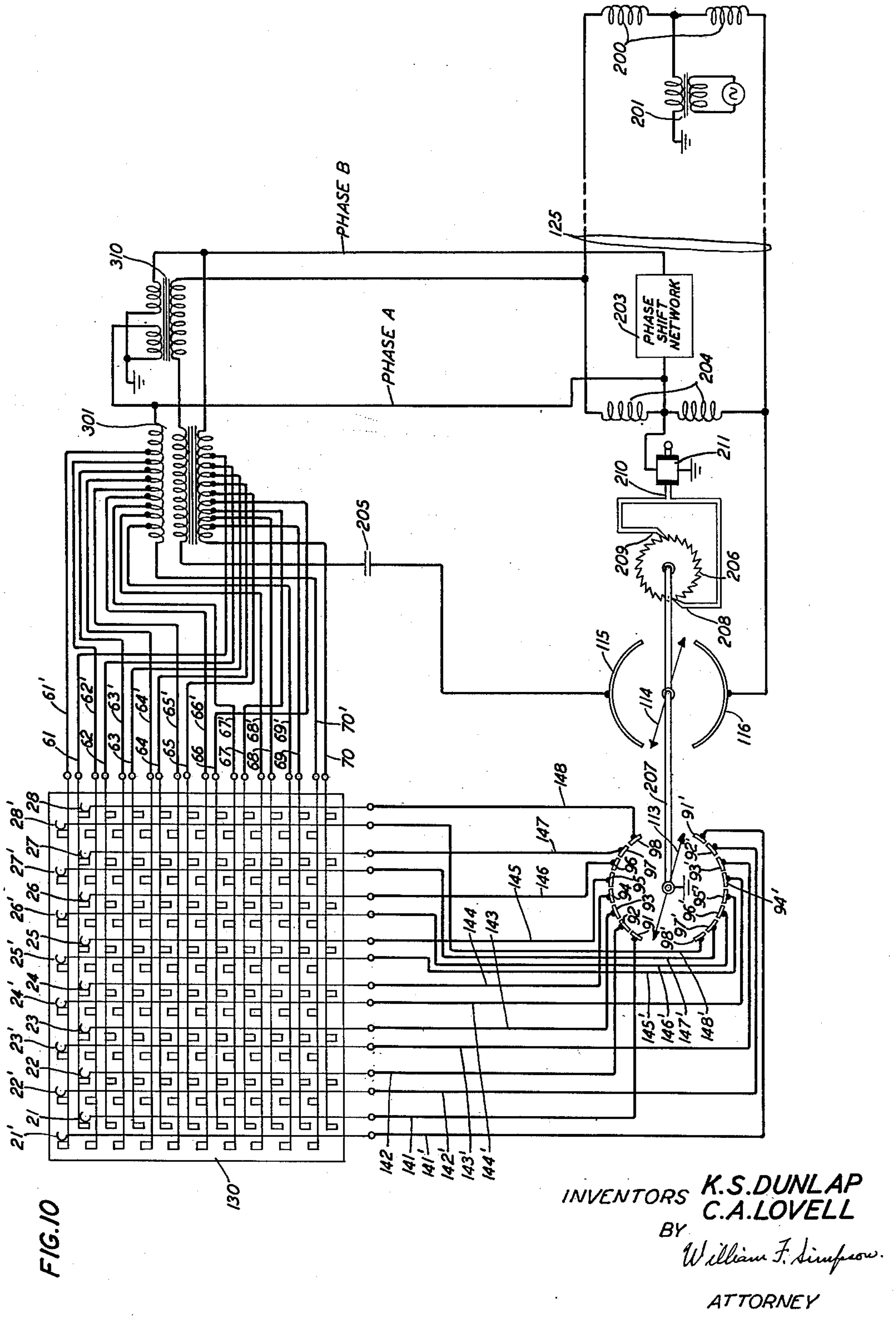
Fig. 10 shows the manner in which the dial, the stepping mechanism, the pulsing transformers, and other equipment are interconnected and cooperate one with another and with the telephone line.

In the embodiment of this invention shown in Fig. 10, the alternating current to energize the stepping device and provide the excitation current for the pulsing transformers is supplied through a simplex circuit. The alternating current is applied between the two line conductors 125 and ground. The interconnection between the source of alternating current and the two line conductors is simplex coil 200 having similar electrical properties to simplex coil 204. The source of alternating current is connected between the center tap of coil 200 and ground through transformer 201. Thus, the potential between the center tap of coil 204 and ground is a function of the potential developed across the secondary of transformer 201. In this manner the alternating current to operate the stepping mechanism and to serve as the excitation current for the pulsing transformers is transmitted over the telephone line.

In operating the calling device in accordance with this invention the subscriber will first position the dials or finger wheels 21 through 28, inclusive, in accordance with the digits, characters or symbols of the called subscriber's station designation or number. Actuation of these selecting devices will cause the members 21 through 28 and 21' through 28' to selectively make contact with the bus-bars 61 through 70 and 61' through 70' and thus contact with the various taps of the input windings of the pulse coil 301. Thereafter the subscriber will initiate a call which in turn causes alternating-current power to be applied between both conductors to the subscriber's line 125 and ground, through transformer 201 and simplex coil 200, for example. The alternating current is then transmitted to the subscriber's station where it actuates the stepping magnet 211 and causes the brush arms 113 and 114 to rotate one step for each half cycle of alternating current. Likewise, during each half cycle of the alternating current, a start pulse is generated in the output winding of the start pulse coil 310 and a pulse is also generated at a later interval of time during the same half cycle in the output winding of the stop pulse coil 301.

Assuming that the distributor brush arms 113 and 114 start from the position shown and are rotated in a clockwise direction by the stepping magnet 211, during the first half cycle of the alternating current, arms 113 and 81 will complete a circuit from segments 91 and 91' to ground and between segments 115 and 116 respectively. In completing a circuit between segments 115 and 116 the output windings of coils 301 and 310 are connected through the pulse-forming network or condenser 205 to the conductors of the subscriber's line 125 extending to the central station. The connection of segments 91 and 91' to ground through brush 113 connects ground to one of the taps of each of the tapped input windings of coil 301. The particular taps to which ground is connected are controlled by the setting of the contacts carried by the dial or finger wheel 21.

During each subsequent half cycle the succeeding segments 92 through 98 and 92' through 98' are successively connected to ground and each of these segments in turn connects ground to one of the taps of the stop pulse coil 301 in accordance with the setting of the corresponding dial or finger wheel, thus causing the transmission of stop pulses at varying time intervals after the transmission of the start pulse in accordance with the setting of the various dials or hand wheels at the calling subscriber's station.

After eight digits have been transmitted the brush arms 113 and 114 make contact with no other segments, with the result that for two half cycles, that is, two steps of the stepping magnet 211, no pulses are transmitted, thus indicating that a complete called station designation has been transmitted. Thereafter the above cycle of operations is repeated and the various pulses repeated so long as the alternating-current power is connected to the line at the central office or some other distant station.

What is claimed is:

1. In a telephone calling system, a subscriber's station, a subscriber's line extending therefrom, impulse transmitting means comprising an impulse coil having a saturable core, a first tapped input winding, a supply of polyphase alternating current, means for connecting said winding of one of the phases of said polyphase alternating-current supply, a second tapped input winding, means for connecting said second winding to a second phase of said polyphase alternating-current supply, apparatus for simultaneously selecting a tap on each of said windings for controlling the number of ampere-turns applied said core from each of said phases which ampere-turns produce a substantially constant resultant maximum number of ampere-turns applied to said core for each of said pair of selected taps, an output winding interlinking said core and means for connecting said output winding to said subscriber's line.

2. In a telephone subscriber's station set, a subscriber's line, means for receiving alternating power current over said subscriber's line, calling apparatus included in said subscriber's set comprising an impulse coil having a saturable core, a plurality of tapped input windings and an output winding all interlinking said core, means for supplying to one of said tapped input windings power received over said line having one phase, other apparatus for applying an alternating current of different phase derived from said current received from said subscriber's line to another of said tapped windings, apparatus for selecting pairs of taps one on each of said windings so related to each other that the total magnetomotive force applied to the core is substantially constant for each selected pair of said taps, output windings interlinking said core, and means interconnecting said output winding and said subscriber's line.

3. In a telephone subscriber's calling arrangement comprising a core of saturable material, a first tapped input winding interlinking said core, a second tapped input winding also interlinking said core, a supply of alternating current including different phases thereof in phase quadrature, tap selecting mechanism for simultaneously selecting pairs of said taps, which taps are so related one to the other that the square root of the sum of the squares of the ampere-turns applied to said core by each of said windings remain substantially constant and independent of selected pair of taps of said windings.

KERMIT S. DUNLAP.
CLARENCE A. LOVELL.

REFERENCES CITED

The following references are of record in the file of this patent:

UNITED STATES PATENTS

| Number | Name | Date |
|---|---|---|
| 2,499,606 | Parkinson | Mar. 7, 1950 |